US006821465B1

(12) United States Patent
Stein et al.

(10) Patent No.: US 6,821,465 B1
(45) Date of Patent: Nov. 23, 2004

(54) DOOR TRIM PANEL WITH INTEGRAL SOFT ARMREST PAD AND PROCESS FOR MANUFACTURING SAME

(75) Inventors: Arthur C. Stein, Gross Isle, MI (US); Ismael Rodriguez, West Chester, PA (US); Roland Ewaniuk, Newtown Square, PA (US); Thomas C. Sloane, Newtown Square, PA (US)

(73) Assignee: JSP Licenses, Inc., Wilmington, DE (US)

( * ) Notice: Subject to any disclaimer, the term of this patent is extended or adjusted under 35 U.S.C. 154(b) by 0 days.

(21) Appl. No.: 10/654,254

(22) Filed: Sep. 3, 2003

(51) Int. Cl.[7] ............................................... B29C 65/10
(52) U.S. Cl. ........................ 264/83; 264/112; 264/126; 264/248; 264/250; 264/259
(58) Field of Search ........................... 264/83, 126, 112, 264/248, 250, 259

(56) References Cited

U.S. PATENT DOCUMENTS

| 5,474,841 A | 12/1995 | Matsuki et al. |
| 5,928,734 A | 7/1999 | Scherf |
| 6,183,038 B1 | 2/2001 | Hansen et al. |
| 6,210,613 B1 | 4/2001 | Stein et al. |
| 6,422,640 B2 | 7/2002 | Whitehead et al. |
| 6,695,998 B2 * | 2/2004 | Sandefer et al. ........... 264/46.4 |
| 6,723,263 B2 * | 4/2004 | Whitehead et al. ........ 264/45.4 |

* cited by examiner

Primary Examiner—Stephen J. Lechert, Jr.
(74) Attorney, Agent, or Firm—Caesar, Rivise, Bernstein, Cohen & Pokotilow, Ltd.

(57) ABSTRACT

A process for manufacturing a door trim panel with an integral soft armrest pad is provided which includes providing male and female steam chest mold halves, loading and restraining a cover material onto the female mold half, closing the male mold half to a fill position to form a cavity, inserting a divider into the cavity to separate the cavity into a low density volume and a high density volume, filling the high density volume with first polymeric material, filling the low density volume of the mold cavity with second polymeric material, withdrawing the divider from the mold cavity, and heating the first and second polymeric materials such that the first and second polymeric materials are melt bonded together, including at positions where particles from the first polymeric material contact particles from the second polymeric material. The low density volume creates the soft armrest pad.

25 Claims, 3 Drawing Sheets

DOOR TRIM PANEL WITH INTEGRAL SOFT ARMREST PAD AND PROCESS FOR MANUFACTURING SAME

BACKGROUND OF THE INVENTION

The present invention relates generally to door trim panels. More specifically, the present invention relates to door trim panels having an armrest support component.

Conventional construction of automotive door trim panels employs many processes, constructions and materials to incorporate an armrest support component into the trim function. The purpose of this support component is to serve as a resilient surface which is comfortable to the occupant's elbow and forearm. Many base level trim panels do not incorporate this feature due to cost restrictions, but rather opt for more economical solutions resulting in uncomfortable hard molded surfaces. Current process options needed to provide a separate soft armrest feature into the trim panel include the manufacturing of separate multi-layer structures consisting of substrates, soft interlayers and a coverstock which is molded into a composite in a final foaming mold. These manufacturing processes include rotational molding, blow molding, overshoot injection molding, foam-in-place (FIP) polyurethane molding and others. Additionally, the tools, equipment, and materials needed to manufacture these components are expensive and add substantial cost to the trim panel system.

Additionally, recent trends in trim design have been concentrated on weight reduction and improved crashworthiness. Current materials and structures associated with the armrest component are generally mass intensive and introduce a material structure which transfers impact loads directly to the occupant along with the added complication of fractured remnants of substrate materials being driven into the interior space. Design trends tend toward the aesthetic flow of like surfaces from the instrument panel through the door trim and into the rear cabin area. In the past, separate armrests introduced materials and surfaces which were more difficult to blend into acceptable levels of appearance. It would be beneficial to have a trim design that accommodates an appropriate harmony of color, gloss and texture.

The prior art teaches various designs. For example, U.S. Pat. No. 5,474,841 (Matsuki et al.) is directed to a cellular molded article of a polypropylene resin having a skin produced by placing a skin material on the surface of a die, clamping the die to form a mold, then charging the mold with pre-expanded particles of polyethylene resin, pre-heating the pre-expanded particles using steam supplied through the vapor holes of the die at a temperature lower than temperature at which the pre-expanded particles are melt bonded together, and then holding the pre-expanded particles in the steam. Next, main heating of the pre-expanded particles is applied through the die at a temperature not less than the temperature at which the pre-expanded particles are melt bonded together. At the time of the main heating of the pre-expanded particles through the die, the die may also be heated up as needed.

U.S. Pat. No. 5,928,734 (Scherf) is directed to a soft trim part which is suitable for an automobile interior dashboard or armrest. The trim part includes a core made of expanded polypropylene (EPP) to which a decorative layer (made of fabric and/or foil) is fused. To manufacture such a trim part, an edge zone of the EPP core is heated above a melting temperature and the decorative layer is applied and pressed on, fusing the decorative layer to the EPP core part. The fused area cools to form a skin-like carrier layer which is relatively stiff and solid, holding the decorative layer to the core part.

Many materials, methods, and designs are currently in use on vehicles to facilitate the resilient armrest feature on door trim panels. Performance and cost penalties are associated with these current solutions. Among these are high mass, high cost and the lack of energy absorbing characteristics. The separate soft armrest feature is, in many cases, the single most costly component in the trim system. The present invention offers an inexpensive alternative to those products. Economies are gained through the integration of the soft armrest into the surrounding bolster/trim panel. The invention encompasses a single step molding process thereby eliminating costs of many separate manufacturing operations such as molding substrate, forming covers, and finally insert molding the composite to form an armrest assembly.

All references cited herein are incorporated herein by reference in their entireties.

BRIEF SUMMARY OF THE INVENTION

A process for manufacturing a door trim panel with an integral soft armrest pad is provided. First, a male steam chest mold half and a female steam chest mold half are provided. A cover material is loaded and restrained on the female mold half. The male mold half is closed relative to the female mold half to a fill position wherein a mold cavity is formed. At least one divider device is inserted into the mold cavity to separate the mold cavity into at least one low density volume and at least one high density volume. The high density volume of the mold cavity is filled with a quantity of a first polymeric material and the low density volume of the mold cavity is filled with a quantity of a second polymeric material (independently of the filling of the high density area). The divider device(s) are withdrawn from the mold cavity. The first and second polymeric materials are heated, using steam supplied through the vapor holes in the mold halves at a temperature not less than the temperature at which particles of each of the first and second polymeric materials are melt bonded together, including at positions where particles from the first polymeric material contact particles from the second polymeric material. The low density volume becomes the integral soft armrest pad at the completion of the process.

The step of filling the low density volume of the mold cavity with a second polymeric material may include, for example, filling the mold cavity with expanded polypropylene beads, expanded polyethylene beads, cross-linked polyethylene beads, or cross-linked polypropylene beads. The trim panel may also be molded with no material being injected into the cavity space defined by the divider devices. As a post molding process, the cavity may be filled with a polyurethane material or a material comprised of a polyolefin bead material which has been coated with adhesives.

The step of loading and restraining a cover material includes loading and restraining a cover material of a textile, for example, thermoplastic polyolefin, or a polyvinyl chloride. The cover material may have a backing material of, for example, cross-linked polypropylene, cross-linked polyethylene, polyurethane, thermoplastic polyolefin, or polypropylene. The cover material may cover less than the entire female mold half. The cover material may be pre-formed into a pre-defined shape or may be flat.

The step of loading and restraining a cover material onto the female mold half may include loading and restraining the cover material using mechanical devices, for example, pneumatic devices. The step of inserting at least one divider device may include inserting numerous devices, for example, retractable pins and blades mounted in the male mold half.

In an alternate embodiment of the present invention, a process for manufacturing a door trim panel with an integral soft armrest pad is provided which includes the steps of providing a male steam chest mold half and a female steam chest mold half, loading and restraining a cover material onto the female mold half, and closing the male mold half relative to the female mold half to a fill position wherein a mold cavity is formed. The process further includes the steps of inserting at least one divider device into the mold cavity to separate the mold cavity into at least one low density volume and at least one high density volume, filling the high density volume of the mold cavity with a quantity of a first polymeric material, and heating the first polymeric material using steam supplied through vapor holes in the mold halves at a temperature not less than the temperature at which particles of the first polymeric material are melt bonded together. Finally, the process further includes the steps of filling the low density volume of the mold cavity with a quantity of a second polymeric material, heating the second polymeric material using steam supplied through vapor holes in the mold halves at a temperature not less than the temperature at which particles of the second polymeric material are melt bonded together, and opening the male mold half relative to the female mold half and removing the finished door trim panel.

In another alternate embodiment of the present invention, a process for manufacturing a door trim panel with an integral soft armrest pad is provided which includes the steps of providing a male steam chest mold half and a female steam chest mold half, loading and restraining a cover material onto the female mold half, and closing the male mold half relative to the female mold half to a fill position wherein a mold cavity is formed. The process further includes the steps of inserting at least one divider device into the mold cavity to separate the mold cavity into at least one low density volume and at least one high density volume, filling the high density volume of the mold cavity with a quantity of a first polymeric material, and heating the first polymeric material using steam supplied through vapor holes in the mold halves at a temperature not less than the temperature at which particles of the first polymeric material are melt bonded together. Finally, the process includes the steps of opening the male mold half relative to the female mold half and removing the door trim panel, loading the door trim panel into a secondary mold and injecting or pouring a second polymeric material into an open cavity to form the soft armrest, heating the second polymeric material at a temperature sufficient to induce curing of the second polymeric material, and opening the male mold half relative to the female mold half and removing the finished door trim panel.

The step of heating the second polymeric material may include heating using heated water circulated through the male and female mold halves. The step of pouring the polymeric material may include pouring polyurethane. The step of pouring the polymeric material may include pouring a polyolefin bead material coated with an adhesive.

A door trim panel with an integral soft armrest pad is also provided which includes a panel having at least one section of a low density polymeric material and at least one section of a high density polymeric material. The section of the low density polymeric material is integral to the section of high density polymeric material. The section of low density polymeric material forms the soft armrest pad. The door trim panel further includes an integral cover material over at least a portion of the high density polymeric material. The cover material may be over at least a portion of the low density polymeric material also.

The section of the low density polymeric material may be, for example, expanded polypropylene beads, expanded polyethylene beads, cross-linked polyethylene beads, cross-linked polypropylene beads, or polyurethane. The cover material may be a textile of, for example, thermoplastic polyolefin or polyvinyl chloride. The cover material may have a backing material of, for example, cross-linked polypropylene, cross-linked, polyurethane, thermoplastic polyolefin, or polypropylene. The cover material may cover less than the entire female mold half. The cover material may be of a pre-formed shape or flat.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The present invention is directed to a method of manufacturing a soft armrest feature which is integral to the surrounding trim panel or bolster/armrest component as part of a single multi-density component. This component contains an area of the soft resilient material at the armrest shelf, thereby providing an equivalent amount of comfort and support as that of the conventional separate armrest.

The present invention also has improved weight reduction and improved crashworthiness as compared to the prior art. The present invention provides a low cost, low mass, energy absorbing, integral alternative to current construction.

Figure 1:
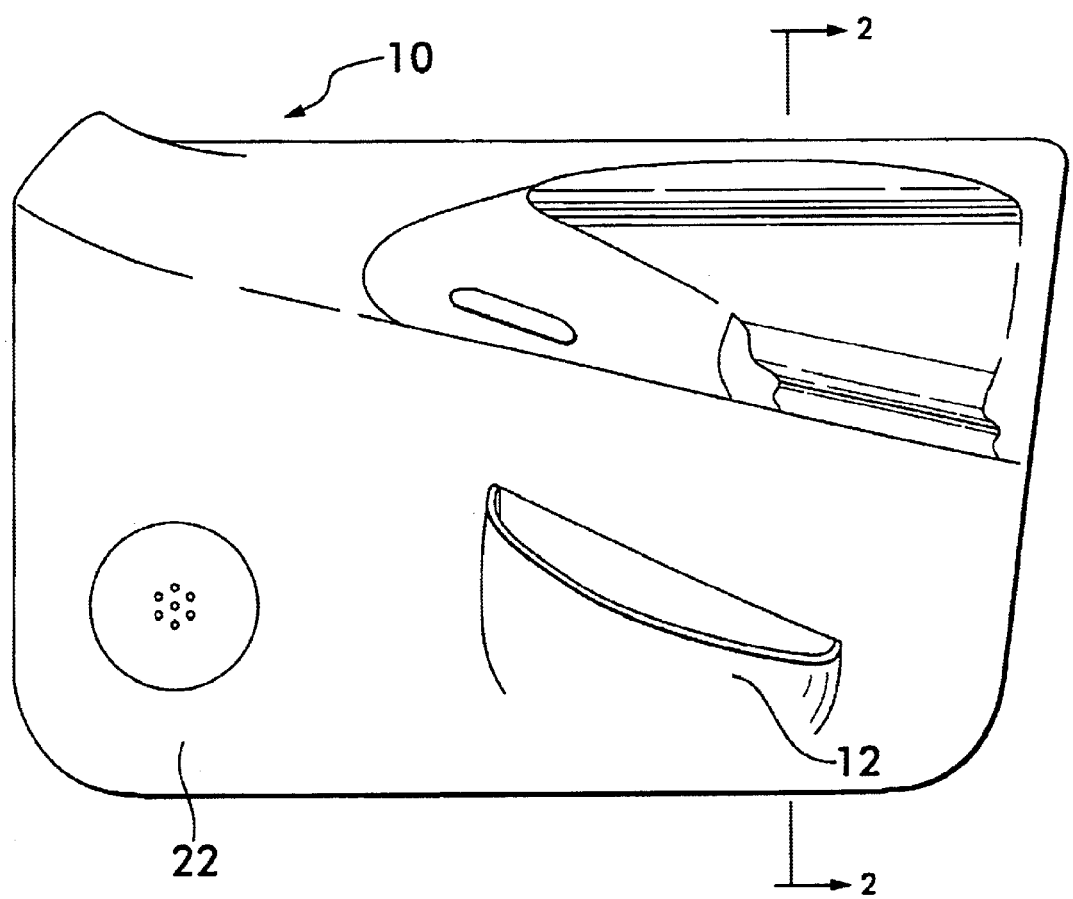
FIG. 1 is a side elevational view of a door trim panel with integral soft armrest pad in accordance with one preferred embodiment of the present invention.

Referring now to the drawings, wherein like part numbers refer to like elements throughout the several views, there is shown in FIG. 1 a door trim panel with integral soft armrest pad 10 in accordance with one preferred embodiment of the present invention. As can be see most clearly in FIG. 2, which depicts a cross-section of the door trim panel 10, the door trim panel includes the integral soft armrest pad 12. The door trim panel 10 has at least one section of a high density polymeric material (first polymeric material 16) and one section or more of a low density polymeric (second polymeric material 14). Where the section of the second, low density polymeric material 14 contacts the first, high density polymeric material 16, e.g., at junctions 18, 20 the low density polymeric material is integral to the high density polymeric material. That is, the particles of the second, low density polymeric material are permanently fused and/or mechanically bonded to the particles of the first, high density polymeric material. The section of second, low density polymeric material 14 forms the soft armrest pad 12.

Typically, the first, high density material may be in the range of 2.8 to 15 pounds per cubic foot and the second, low density materials may in a range of 0.8 to 2.0 pounds per cubic foot.

The outer surface of the core 24 (having the section of low density polymeric material 14 and the section of high density polymeric material 16) of the of the door trim panel 10 has an integral cover material 22. This cover material 22 is located over at least a portion of the section of high density polymeric material 16 and is also be placed over at least a portion of the low density polymeric material 14.

Figure 3:
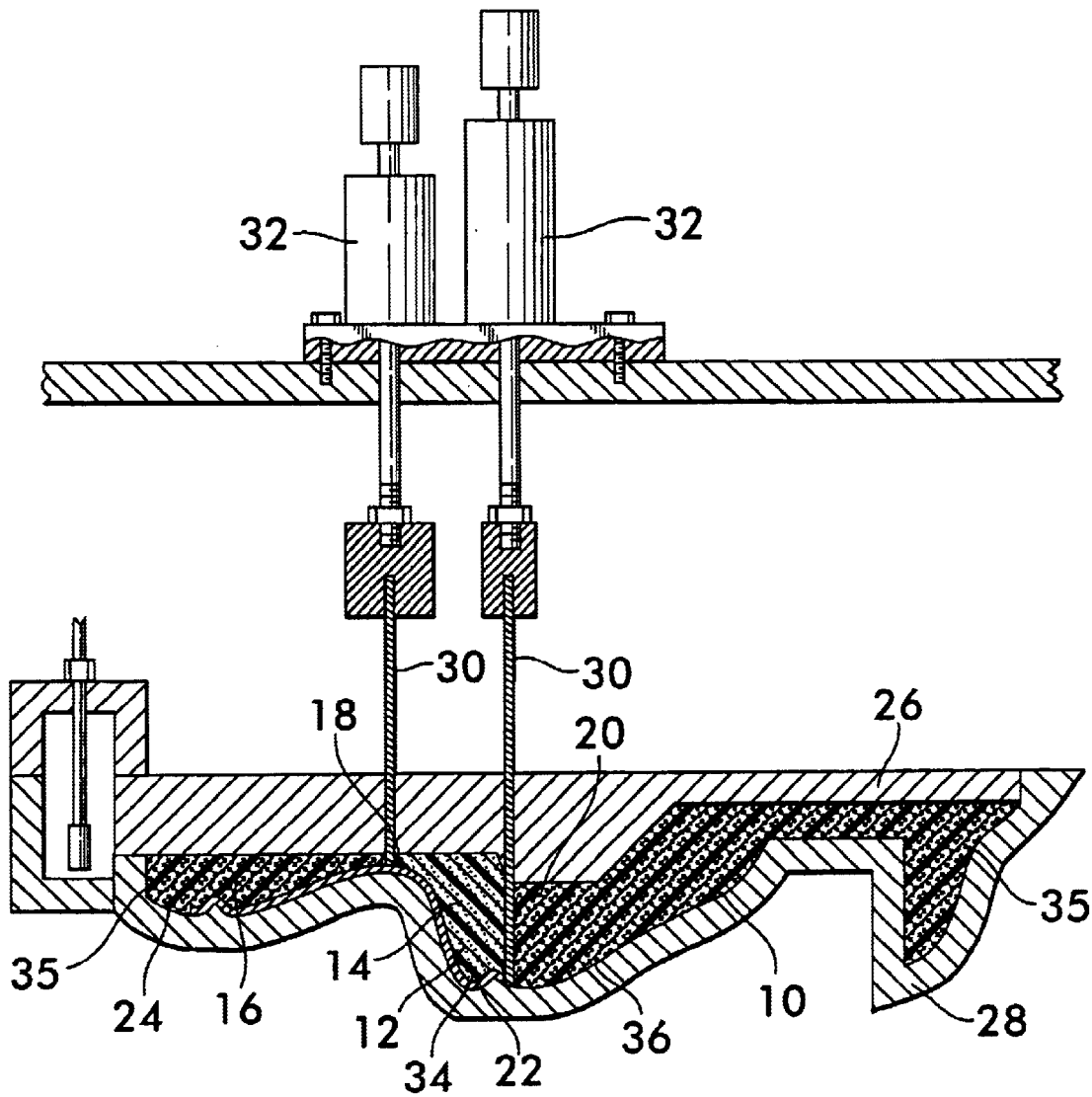
FIG. 3 is a simplified cross sectional view of an apparatus to construct the door trim panel with integral soft armrest pad of FIG. 1.

As shown in simplified form in FIG. 3, the door trim panel 10 is manufactured using an advanced steam chest molding process in accordance with the present invention. The molding process utilizes a male mold half 26 and female mold half 28 mounted into a bead foam molding press (i.e., a press capable of performing a steam chest molding process). The cover material 22 (commonly known as a "foil" to those skilled in the art) is loaded onto the female mold half 26 either in a flat condition or as a pre-formed shape (shaped to generally conform with the inner surface of the female mold half 28). Product shape, coverage desired, and overall design dictate the need to pre-form prior to insertion into the mold. The cover material 22 is located and restrained via retaining devices such as mechanical and pneumatic devices.

Upon loading the cover material 22, the male mold half 26 closes to a fill position forming a mold cavity 36. This position may provide additional part volume which could later be crushed to final part thickness as a means of controlling product and process characteristics, as is well known in the art of steam chest molding. In this position; the second, low density polymeric material 14, which will become the resilient integral soft armrest pad 12, is defined and segregated from the surrounding high density polymeric material 16, for example, fill of expanded polypropylene. This is accomplished with the use of divider devices, for example, in the form of mechanical pins and/or blades 30 which are mounted through the male mold half 26. These pins and/or blades 30 are moved into a position slightly clear of the cover material 22 via, for example, pneumatic or hydraulic devices 32. The low-density mold volume 34 of the mold cavity 36 defined by the retractable pins and/or blades 30 can be filled independently of the surrounding polymeric material (the high density mold volume 35) and may be filled at any time after mold close through the use of a dedicated fill gun (not shown). These pins and/or blades 30 are separating devices that are retractable at a point in the steam chest cycle to allow the adjacent bead interfaces to fuse bond resulting in a single solid door trim panel.

The filling and heating of the low density volume 34 may be accomplished entirely independently of the filling and heating of the high density volume 35. That is, the low density volume 34 of the mold cavity 36 may be filed with a quantity of the low density polymeric material 14 and then the low density polymeric material 14 is heated using steam supplied through vapor holes in the mold halves 26,28. Simultaneously, prior to, or subsequently, the high density volume 35 of the mold cavity 36 may be filled with a quantity of the high density polymeric material 16 and then the high density polymeric material 16 is heated using steam supplied through vapor holes in the mold halves 26,28. Heating, i.e., steam chest molding, of the high and low density polymeric materials 14, 16 may therefore be accomplished simultaneously or serially.

The present invention applies to a molded door trim panel with integral soft armrest pad 10 at various trim levels which would include a partially covered base trim panel to a fully covered up-level trim panel. The construction of the door trim panel 10 includes the cover material 22 which may be a single laminate of thermoplastic polyolefin, a bi-laminate cover material consisting of textile or polyolefin top skin and a backing material, or a trilaminate material consisting of a textile or polyolefin top skin with a backing material and a thermoplastic olefin bottom layer.

This low density polymeric material in the armrest area may be one of many materials, such as expanded polypropylene (EPP), expanded polyethylene (EPE), cross linked polyethylene (XLPE), cross-linked polypropylene (XLPP), or polyurethane (PU). The door trim panel 10 is manufactured using steam chest molding technology. The cover material 22 on the visible surface may be, for example, a textile, a thermoplastic polyolefin (TPO), or a polyvinyl chloride (PVC). All listed cover materials may have backing materials such as XLPP, XLPE, PU, TPO, or polypropylene bonded to a surface of the cover material 22 prior to being backmolded with, for example, EPP. The cover material 22 may fully or partially cover the visible side of the trim panel 10 based on design requirements.

Figure 2:
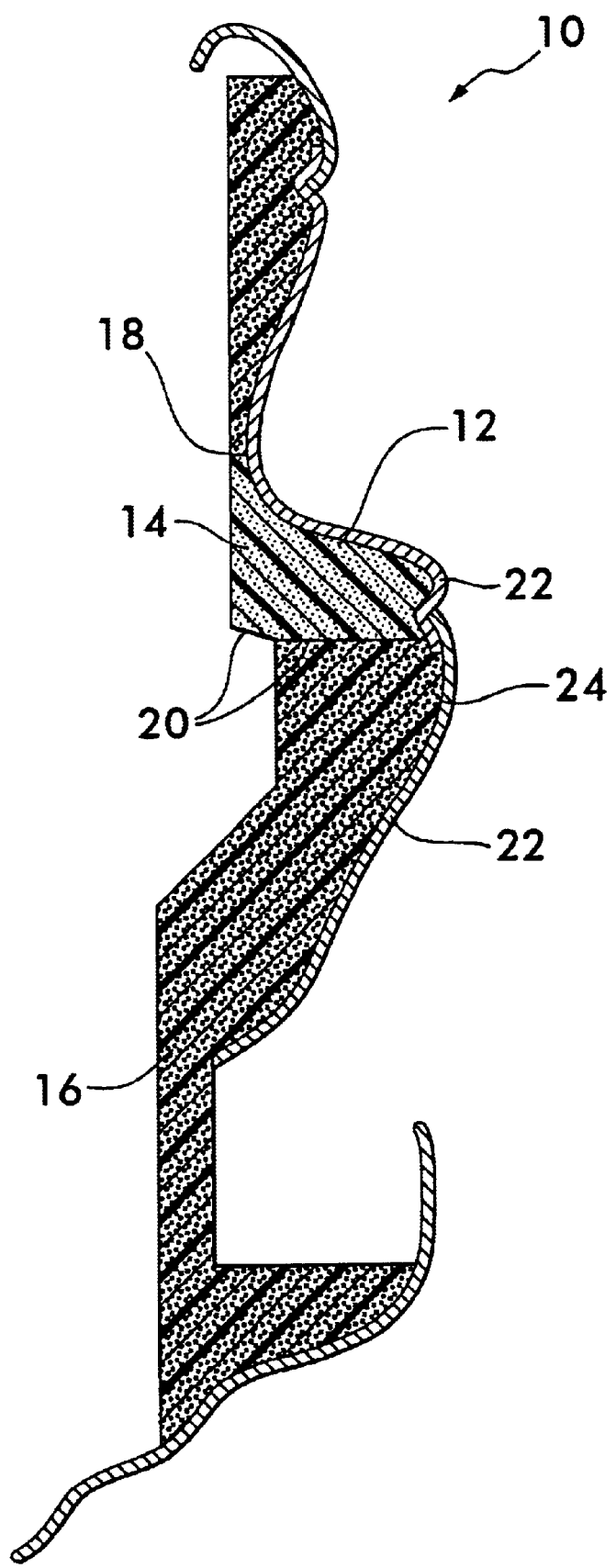
FIG. 2 is a cross-sectional view of the door trim panel with integral soft armrest pad of FIG. 1, taken substantially along lines 2—2 of FIG. 1.

In an alternate embodiment of the present invention, a door trim panel with integral soft armrest pad 10 as shown in FIG. 2 is constructed, but here, the low density volume 34, i.e., the area defined by the mechanical pins and/or blades 30 is not filled in the initial steam chest molding process, but is left void of any material. The result is a covered, molded trim panel with a cavity where the soft armrest material is to be placed in a subsequent operation. In this subsequent molding operation, this cavity is filled with one of many materials such as polyurethane, adhesively coated cross-linked polypropylene, or adhesively coated cross-linked polyethylene (as known in the art) to form the soft armrest. That is, the armrest cavity is formed by the male mold half 26 and female mold half 28. The door trim panel 10 is demolded from the steam chest mold halves (with the armrest cavity remaining unfilled). The door trim panel 10 is then molded into a separate mold and a second, low density polymeric material such as polyurethane is poured (injected) into the armrest cavity to form the integral soft armrest pad.

While the invention has been described in detail and with reference to specific embodiments thereof, it will be apparent to one skilled in the art that various changes and modifications can be made therein without departing from the spirit and scope thereof.

What is claimed is:

1. A process for manufacturing a door trim panel with an integral soft armrest pad comprising the steps of:

(a) providing a male steam chest mold half and a female steam chest mold half;

(b) loading and restraining a cover material onto the female mold half;

(c) closing the male mold half relative to the female mold half to a fill position wherein a mold cavity is formed;

(d) inserting at least one divider device into the mold cavity to separate the mold cavity into at least one low density volume and at least one high density volume;

(e) filling the high density volume of the mold cavity with a quantity of a first polymeric material;

(f) filling the low density volume of the mold cavity with a quantity of a second polymeric material, independently of filling of the high density area;

(g) withdrawing the at least one divider device from the mold cavity; and (h) heating the first and second polymeric materials, using steam supplied through vapor holes in the mold halves at a temperature not less than the temperature at which particles of each of the first and second polymeric materials are melt bonded together, including where particles from the first polymeric material contact particles from the second polymeric material;

whereby the low density volume becomes the integral soft armrest pad at the completion of the process.

2. The process for manufacturing a door trim panel of claim 1, wherein the step of filling the low density volume of the mold cavity with a second polymeric material includes filling the mold cavity with expanded polypropylene beads.

3. The process for manufacturing a door trim panel of claim 1, wherein the step of filling the low density volume of the mold cavity with a second polymeric material includes filling the mold cavity with expanded polyethylene beads.

4. The process for manufacturing a door trim panel of claim 1, wherein the step of filling the low density volume of the mold cavity with a second polymeric material includes filling the mold cavity with cross-linked polyethylene beads.

5. The process for manufacturing a door trim panel of claim 1, wherein the step of filling the low density volume of the mold cavity with a second polymeric material includes filling the mold cavity with cross-linked polypropylene beads.

6. The process for manufacturing a door trim panel of claim 1, wherein the step of loading and restraining a cover material includes loading and restraining a cover material of a textile.

7. The process for manufacturing a door trim panel of claim 1, wherein the step of loading and restraining a cover material includes loading and restraining a cover material of a thermoplastic polyolefin.

8. The process for manufacturing a door trim panel of claim 1, wherein the step of loading and restraining a cover material includes loading and restraining a cover material of a polyvinyl chloride.

9. The process for manufacturing a door trim panel of claim 1, wherein the step of loading and restraining a cover material includes loading and restraining a cover material having a backing material.

10. The process for manufacturing a door trim panel of claim 9, wherein the step of loading and restraining a cover material includes a cover material having a backing material of cross-linked polypropylene.

11. The process for manufacturing a door trim panel of claim 9, wherein the step of loading and restraining a cover material includes a cover material having a backing material of cross-linked polyethylene.

12. The process for manufacturing a door trim panel of claim 9, wherein the step of loading and restraining a cover material includes a cover material having a backing material of polyurethane.

13. The process for manufacturing a door trim panel of claim 9, wherein the step of loading and restraining a cover material includes a cover material having a backing material of thermoplastic polyolefin.

14. The process for manufacturing a door trim panel of claim 9, wherein the step of loading and restraining a cover material includes a cover material having a backing material of polypropylene.

15. The process for manufacturing a door trim panel of claim 9, wherein the loading and restraining a cover material includes loading and restraining a cover material that covers less than the entire female mold half.

16. The process for manufacturing a door trim panel of claim 1, wherein the step of loading and restraining a cover material onto the female mold half includes loading and restraining a pre-formed cover material.

17. The process for manufacturing a door trim panel of claim 1, wherein the step of loading and restraining a cover material onto the female mold half includes loading and restraining a flat material.

18. The process for manufacturing a door trim panel of claim 1, wherein the step of loading and restraining a cover material onto the female mold half includes loading and restraining the cover material using mechanical devices.

19. The process for manufacturing a door trim panel of claim 1, wherein the step of loading and restraining a cover material onto the female mold half includes loading and restraining the cover material using pneumatic devices.

20. The process for manufacturing a door trim panel of claim 1, wherein the step of inserting at least one divider device includes inserting a plurality of devices selected from the group consisting of retractable pins and blades mounted in the male mold half.

21. A process for manufacturing a door trim panel with an integral soft armrest pad comprising the steps of:

(a) providing a male steam chest mold half and a female steam chest mold half;

(b) loading and restraining a cover material onto the female mold half;

(c) closing the male mold half relative to the female mold half to a fill position wherein a mold cavity is formed;

(d) inserting at least one divider device into the mold cavity to separate the mold cavity into at least one low density volume and at least one high density volume;

(e) filling the high density volume of the mold cavity with a quantity of a first polymeric material;

(f) heating the first polymeric material using steam supplied through vapor holes in the mold halves at a temperature not less than the temperature at which particles of the first polymeric material are melt bonded together;

(g) filling the low density volume of the mold cavity with a quantity of a second polymeric material;

(h) heating the second polymeric material using steam supplied through vapor holes in the mold halves at a temperature not less than the temperature at which particles of the second polymeric material are melt bonded together; and (i) opening the male mold half relative to the female mold half and removing the finished door trim panel.

22. A process for manufacturing a door trim panel with an integral soft armrest pad comprising the steps of:

(a) providing a male steam chest mold half and a female steam chest mold half;

(b) loading and restraining a cover material onto the female mold half;

(c) closing the male mold half relative to the female mold half to a fill position wherein a mold cavity is formed;

(d) inserting at least one divider device into the mold cavity to separate the mold cavity into at least one low density volume and at least one high density volume;

(e) filling the high density volume of the mold cavity with a quantity of a first polymeric material;

(f) heating the first polymeric material using steam supplied through vapor holes in the mold halves at a temperature not less than the temperature at which particles of the first polymeric material are melt bonded together;

(g) opening the male mold half relative to the female mold half and removing the door trim panel;

(h) loading the door trim panel into a secondary mold and pouring a second polymeric material into an open cavity to form the soft armrest;

(i) heating the second polymeric material at a temperature sufficient to induce curing of the second polymeric material; and (j) opening the male mold half relative to the female mold half and removing the finished door trim panel.

23. The process for manufacturing a door trim panel of claim 22, wherein the step of heating the second polymeric material includes heating using heated water circulated through the male and female mold halves.

24. The process for manufacturing a door trim panel of claim 22, wherein the step of pouring the polymeric material includes pouring polyurethane.

25. The process for manufacturing a door trim panel of claim 22, wherein the step of pouring the polymeric material includes pouring a polyolefin bead material coated with an adhesive.

* * * * *